United States Patent
Webb et al.

(10) Patent No.: US 8,332,737 B2
(45) Date of Patent: Dec. 11, 2012

(54) INSTRUMENT CONTROL SYSTEM AND METHODS

(75) Inventors: Peter G. Webb, Menlo Park, CA (US); Jayati Ghosh, Sunnyvale, CA (US); Bo Curry, Redwood City, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 744 days.

(21) Appl. No.: 12/492,487

(22) Filed: Jun. 26, 2009

(65) Prior Publication Data

US 2010/0332953 A1    Dec. 30, 2010

(51) Int. Cl.
*G06F 11/00* (2006.01)
*G06F 11/30* (2006.01)

(52) U.S. Cl. ...................................... 714/811
(58) Field of Classification Search ............ 714/811
See application file for complete search history.

(56) References Cited

U.S. PATENT DOCUMENTS

| | | | |
|---|---|---|---|
| 5,185,866 A | 2/1993 | Francisco | |
| 5,546,452 A * | 8/1996 | Andrews et al. | 379/219 |
| 7,155,499 B2 * | 12/2006 | Soemo et al. | 709/223 |
| 7,155,515 B1 * | 12/2006 | Brown et al. | 709/226 |
| 7,457,903 B2 | 11/2008 | Purdham et al. | |
| 7,485,871 B2 * | 2/2009 | Gates et al. | 250/394 |
| 7,904,182 B2 * | 3/2011 | Hosek et al. | 700/1 |
| 8,000,850 B2 * | 8/2011 | Nasr et al. | 701/20 |
| 8,082,370 B2 * | 12/2011 | Lee et al. | 710/15 |
| 8,117,360 B2 * | 2/2012 | Iwagami et al. | 710/59 |
| 2003/0215936 A1 | 11/2003 | Kallioniemi et al. | |
| 2004/0054494 A1 | 3/2004 | El-Khashab | |
| 2005/0079102 A1 | 4/2005 | Staton et al. | |

* cited by examiner

*Primary Examiner* — Stephen M Baker
(74) *Attorney, Agent, or Firm* — James S. Keddie; Bret E. Field; Bozicevic, Field & Francis, LLP (57) ABSTRACT

Methods, systems and computer readable media for controlling an instrument in communication with a host computer are provided. Operations of an instrument that must be completed on schedule are controlled via an embedded controller embedded in the instrument. A complete status packet is sent to a host computer from the embedded controller. Periodically, the embedded controller repeats the sending of a complete status packet to the host computer, wherein status values in the complete status packet are updated with each iteration of sending a complete status packet.

26 Claims, 3 Drawing Sheets

INSTRUMENT CONTROL SYSTEM AND METHODS

BACKGROUND OF THE INVENTION

A common mechanism for controlling an instrument is to have an embedded "real-time" controller that is responsible for tasks that must be completed on schedule; and a host computer that performs more complex sequencing, user interface, data processing, etc. The embedded system typically runs a real-time operating system or kernel, or no operating system at all, while the host computer runs an operating system such as MICROSOFT WINDOWS, MAC OS, LINUX, etc The common paradigm for controlling such instruments is called "command-response", e.g., see U.S. Pat. No. 5,185,866 and U.S. Patent Application Publication No. 1003/0215936, both of which are incorporated herein, in their entireties, by reference thereto. Using the command-response paradigm, the host computer sends a command to the embedded controller. The embedded controller, upon receiving the command, completes the command, and then responds to the host computer with a completion status message. If the host computer/user wants to read a parameter from the embedded system, a command is issued by the host computer to the embedded controller to request that parameter. The embedded controller, upon receiving the command, returns the requested parameter value in a return message sent to the host computer.

The command-response paradigm as described above, includes several limitations that could be improved upon For example, each modification to the host computer system that requires a parameter to be read from the embedded controller generates a command that needs to be sent to the embedded controller. Each command sent from the host computer to the embedded controller perturbs the activity of the embedded controller in controlling the instrument to perform it scheduled tasks. Accordingly, this slows down operations.

If diagnostic tests are run which track parameters of the instrument being controller, the load on the embedded controller/embedded system is quite different from the normal operational load. This can also slow operations.

Fault conditions are difficult to troubleshoot if insufficient state data has been sent from the embedded controller to the host computer and recorded on the host computer. "Back-channel" status reporting and recording mechanisms are often added for development and troubleshooting, but this increases complexity of the overall system and particularly of the embedded controller. Further, such mechanism are often ad-hoc, and as such are difficult to maintain and are difficult to utilize as test mechanisms at customer sites.

Control of concurrent activities by the embedded controller can become quite complex using the command-response paradigm, as the host computer and embedded controller are required to keep track of which response belongs with each command.

Another drawback is that synchronization of state between the instrument hardware and the host computer software is complex and error prone.

Because of the limitations noted above, the programming of host computer-embedded controller systems using the command-response paradigm tends to be parsimonious with transmission of parameters; or "back-channel" parameter reporting methods are added to enable the instrument to be monitored.

There is a continuing need for an improved control paradigm for controlling an instrument having an embedded controller by a host computer.

SUMMARY OF THE INVENTION

The present invention provides systems, methods and computer readable media for controlling an instrument in communication with a host computer.

A method is provided, including: controlling operations of an instrument that must be completed on schedule via an embedded controller embedded in the instrument; sending a status packet to a host computer; and periodically repeating the sending a status packet to the host computer, wherein status values in the status packet are updated with each iteration of repeating the sending a complete status packet.

In at least one embodiment, the status packets are complete status packets.

In at least one embodiment, the method includes: sending a command to perform an action from the host computer to the embedded controller; testing, by the embedded controller, as to whether the command is allowed; sending an error code from the embedded controller to the host computer if the command is not allowed, and if the command is allowed, commencing execution of the command by the embedded controller.

In at least one embodiment, the embedded controller includes an acknowledgement of the command in the next periodically repeated sending of a status packet.

In at least one embodiment, the host computer is responsible for determining completion of the command by monitoring one or more fields in the periodically received status packets.

In at least one embodiment, the host computer comprises a multi-threaded processor having multiple threads of operation, and wherein a plurality of the threads of operation each execute a command concurrently.

In at least one embodiment, the host computer monitors execution of each of the commands via the periodically repeating, status packets.

In at least one embodiment, the host computer maintains a shadow of a state of the instrument by unpacking each status packet received.

In at least one embodiment, the status packet is repeatedly, periodically generated and sent at a regular frequency.

In at least one embodiment, a status packet is generated and sent from the embedded controller to the host computer upon the occurrence of a predetermined event.

In at least one embodiment, the instrument comprises a scanner and the predetermined event comprises the scanner reaching the end of a scan line.

A method of controlling an instrument in communication with a host computer is provided, including: sending a command atom from a host computer to an embedded controller embedded in the instrument; processing the command by the embedded controller; generating and sending a status packet, including a status of the command, by the embedded controller to the host computer; and periodically repeating the generating and sending a status packet by the embedded controller to the host computer, wherein status values in the status packet are updated with each iteration of repeating the generating.

In at least one embodiment, the processing of the command comprises controlling the instrument to at least partially perform a physical act.

In at least one embodiment, the host computer prevents additional commands from being sent until acknowledgement of the command has been sent is received in one of the status packets.

In at least one embodiment, the completion of a task instructed by the command is detected by the host computer by monitoring status values in the status packets.

In at least one embodiment, a physical system of the instrument required for a task by the command is locked out by the host computer during performance of the task, thereby preventing a conflicting command that requires use of that system from being sent from the host computer to the embedded controller.

In at least one embodiment, the host computer comprises a multi-threaded processor having multiple threads of operation, wherein a plurality of the threads of operation each execute a command concurrently.

In at least one embodiment, the host computer monitors execution of each of the commands via the periodically repeated status packets.

An instrumentation system is provided, including: an instrument including an embedded controller configured to control execution of operations by the instrument; a host computer configured to communicate with the embedded controller; and programming configured to control operation of the system, which when executed by the system performs: generating and sending a status packet including status parameters of the instrument, by the embedded controller to the host computer; and periodically repeating the generating and sending a status packet by the embedded controller to the host computer, wherein the status parameters in the status packet are updated with each iteration of repeating the generating.

In at least one embodiment, the execution of the programming further causes the system to perform: sending a command atom by the host computer to the embedded controller; processing the command by the embedded controller; and generating and sending one of the status packets, including a status of the command, by the embedded controller to the host computer.

In at least one embodiment, the processing of the command comprises controlling the instrument to at least partially perform a physical act.

A computer readable medium is provided that provides instructions, which when executed on at least one processor, causes the at least one processor to perform a method comprising: generating and sending a status packet including status parameters of an instrument, by an embedded controller embedded in the instrument, to a host computer; and periodically repeating the generating and sending a status packet by the embedded controller to the host computer, wherein the status parameters in the status packet are updated with each iteration of repeating the generating.

In at least one embodiment, the instructions, when executed on the at least one processor, cause the at least one processor to perform: sending a command atom by the host computer to the embedded controller; processing the command by the embedded controller; and generating and sending one of the complete status packets, including a status of the command, by the embedded controller to the host computer.

These and other features of the invention will become apparent to those persons skilled in the art upon reading the details of the methods, systems and computer readable media as more fully described below.

DETAILED DESCRIPTION OF THE INVENTION

Before the present systems, methods and computer readable media are described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a", "an", and "the" include plural referents unless the context clearly dictates otherwise. Thus, for example, reference to "a controller" includes a plurality of such controller and reference to "the status packet" includes reference to one or more status packets and equivalents thereof known to those skilled in the art, and so forth.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

Definitions

The terms "atom" and "packet" are used synonymously herein to refer to a certain number of bytes of data conforming to a protocol agreed upon by the sending and receiving entities, wherein that certain number of bytes are sent/received and processed as a unit.

A "status packet" refers to a set of bytes containing at least values of parameters of the instrument being monitored. The status packet may be formatted by placing each value in an agreed upon position within the packet, or by using name/value pairs wherein the packet comprises the identifier for a parameter and then the value of that parameter, followed by additional names and values in alternating order.

A "complete status packet" refers to a status packet (as defined above)

that includes all parameters that the instrument provides, or at least all parameters that are required for the host computer to make all monitoring decisions.

A "command" refers to data sent from a host computer to an embedded controller, wherein the data, when processed by the embedded controller causes the embedded controller to control an instrument that is it embedded in to perform a task or set a parameter.

A "parameter value" refers to a value for a measurement made by the instrument, or computed during its course of operation, or required to define a task. For example, to move a motion stage of an instrument from one position to another, the host computer may send a command containing parameters for target position, velocity, acceleration, proportional-integral-derivative (PID) loop terms, etc. The embedded processor may send back as status parameters the measured current position of the stage, the computed position error (i.e. the difference between the current position and the commanded position), and the motor current. It may also send back the measured internal temperature of the instrument.

Methods, Systems and Computer Readable Media

Figure 1:
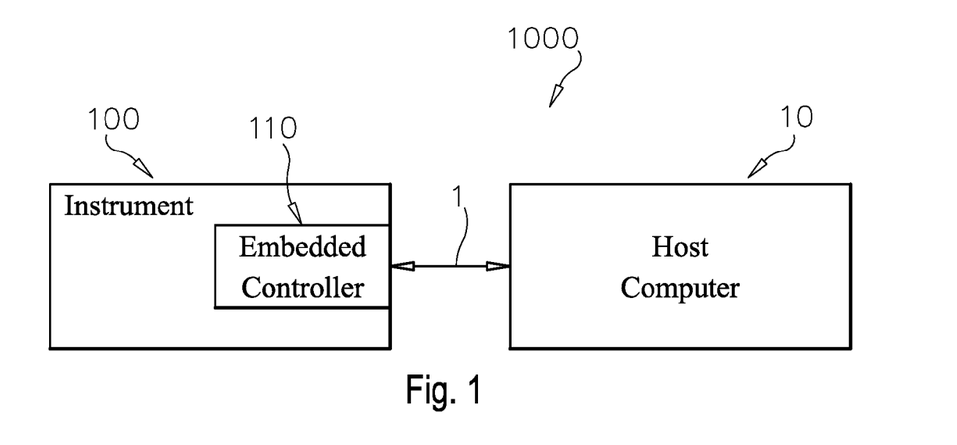
FIG. 1 is a block diagram illustrating a system according to an embodiment of the present invention.

The present invention provides methods, systems and computer readable media for controlling one or more instruments via a host computer, where each instrument includes at least one embedded controller. FIG. 1 is a block diagram illustrating a system according to an embodiment of the present invention. A host computer 10 is connected or connectable to an instrument 100, specifically an embedded controller 110 of instrument 100 to send and receive data thereto and therefrom, respectively. Host computer 10 may be a desktop computer, laptop computer, handheld device, or any other computer device having a processor configured to perform the tasks described herein.

Host computer 10 may be connected/connectable to instrument 100/embedded controller 110 via direct hardwire connection, wireless connection, and/or over a network such as Ethernet, local area network, wide area network (including, but not limited to the Internet), etc. Embedded controller 110 may be a field programmable gate array (FPGA), application-specific integrated circuit (ASIC), digital signal processor (DSP), such as Analog Devices TIGERSHARC, or other embedded process such as Atmel AVR, or the like Instrument 110 may be any instrument capable of being controlled by embedded controller to perform a task such as a mechanical motion, application of heat, application of light, or to provide any other useful, concrete and tangible result. Specifically, instrument 110 is configured to produce a result that is specific and substantial, and is reproducible, and wherein the result is a real world result. Examples of instrument 110 include, but are not limited to: a microarray scanner, a robotic arm, a laser, a heating instrument, a surgical instrument, mass spectrometer, liquid chromatograph, spectrum analyzer, or other instrument having an embedded controller.

Rather than sending information to the host computer 10 via connection only in response to commands from the host computer 10 and/or requests for parameter values from the host computer 10, the embedded controller 110 of the present invention sends a complete status packet of data at periodic intervals to the host computer. As a result, host computer 10 does not have to send commands to embedded controller 110 to request parameter values. Rather, by monitoring the regularly received complete status packets, the host computer regularly received parameter values for all parameters to be monitored. The host computer can keep a history of each parameter being monitored. The host computer can compare multiple values for a parameter over time, to determine the state of that parameter, to thereby determine whether the instrument 100 is functioning within acceptable limits of that parameter. This monitoring can be done on any and all parameters, the values of which are reported in the complete status packet.

Figure 2:
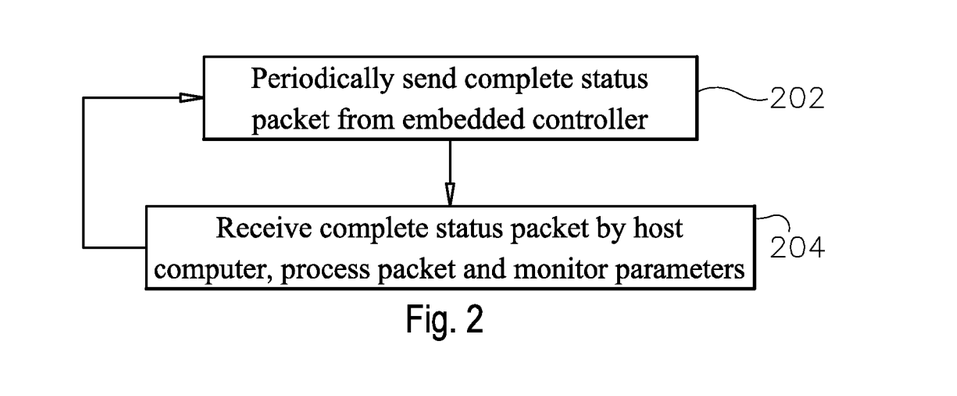
FIG. 2 shows events that are carried out according to an embodiment of operation of a system according to an embodiment of the present invention.

FIG. 2 shows events that are carried out according to an embodiment of operation of the present system 1000. As noted, during operation of the system 1000, embedded controller 110 periodically sends complete status packets to the host computer. Thus, at event 202, embedded controller 110 sends out a complete status packet. At event 204, host computer 10 receives the complete status packet from embedded controller 110, processes the complete status packet and monitors the parameter values contained in the complete status packet. If the parameters being monitored are all within normal ranges, the process of FIG. 2 continues. Embedded controller 10 updates the parameter values and sends another complete status packet after the elapse of a predetermined time interval at event 202, and the host computer receives and processes that packet at event 204. If one or more parameters is determined to be out of acceptable limits/normal range, then the host computer 10 carries out at least one additional function, which may include, but is not limited to, alerting the user of the host computer to the status; sending a command to the embedded controller 110 to modify a setting on the instrument 100 to attempt to bring the parameter reading back to within normal limits; or shutting down operation of the instrument 100.

Figure 3:
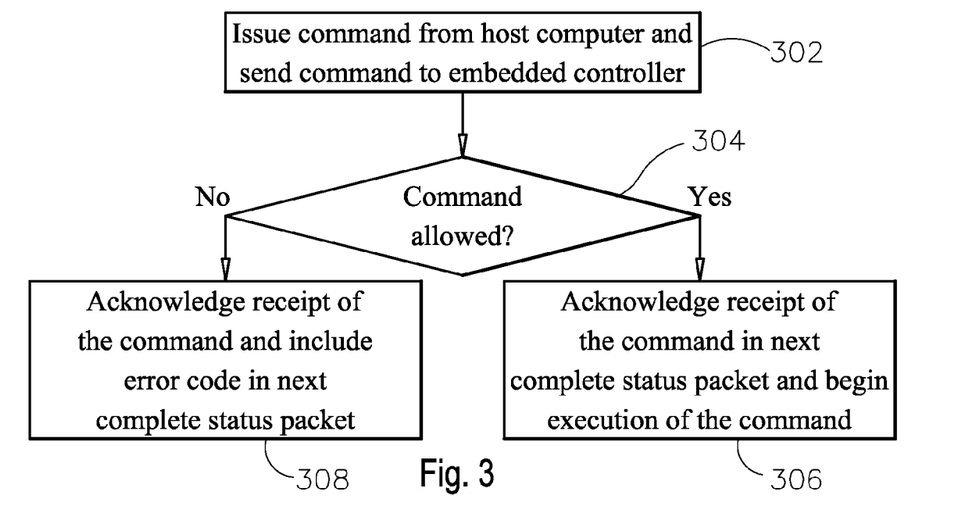
FIG. 3 illustrates issuance and processing of a command by the system according to one embodiment of operation of the present invention.

FIG. 3 illustrates issuance and processing of a command by the system 1000 according to one embodiment of operation of the present invention. At event 302 host computer 302 issues a command to perform an action. This command may be generated as a result of a user inputting instructions for the command into the host computer 10, or by the host computer 10 issuing the command according to preprogrammed instructions, for example. Upon receiving the command (sent in the form of a packet), the embedded controller 110 tests the command to see whether the command is allowed. For example, a motions system may not be allowed to perform a move command if the motion system has not first been homed or otherwise initialized. Testing will identify if these prerequisites have been met. If it is determined that the command is allowed, then the embedded controller acknowledges receipt of the command in the next complete status packet and commences execution of the command, see event 306. If, on the other hand, the command is not allowed, then the embedded controller acknowledges receipt of the command and includes an error code in the next complete status packet, see event 308.

The embedded controller 110 sends out the complete status packets to the host computer 10 at regular frequency. That is, the firmware and/or software of the embedded controller collects all of the parameter values characterizing the instrument (e.g., temperatures, voltages, positions, etc.) and incorporates them into a status packet (alternatively referred to herein as a "status atom packet") and sends the packet to the host computer 10. This is repeated at the end of each period defined by the designated frequency. In one embodiment, controller 110 sends the complete status packets at a frequency of about 10 Hz, although, in other embodiments, a different frequency may be set. In a preferred embodiment, each status packet is a complete status packet. Alternatively, status packets of less than all parameters may be sent out at one frequency, with others of the parameters being sent out at another regular frequency. Further alternatively, a status packet having less than all parameters may be sent out periodically at a first frequency, and complete status packets may be sent out regularly at another frequency. As will be readily apparent, any number of status packets containing different parameters could be regularly sent out at any number of different frequencies, with or without also sending out complete status packets at a regular frequency. The host computer 10 may simply discard any particular complete status packet received if there is no need to review the status information at that time. The host computer can save all or a portion of the data unpacked from the complete status packets and thereby establish a history of one or more parameters, which can be useful for debugging, etc. History files can be deleted after a certain period of time or otherwise managed, such as by backups, etc. The host computer 10 maintains a "shadow" of the instrument state by unpacking the status atom. This shadow is used to perform the tasks from the host side by sending commands to the embedded controller 110. For example, the status of a command to move a motion axis can be observed by monitoring the axis position parameter in each complete status packet received by the host computer 10. Thus, according to the present invention, the embedded controller 110 does not have to send a specific message to the host computer 10 upon completion of a commanded task. Rather, the embedded controller 110 just sends the periodic complete status packets. By monitoring the periodically received complete status packets, the host computer 10 can detect when the commanded task has been completed. Thus, not only can the complete status packets be used by the host computer 10 to diagnose problems with the instrument 100 and check the health (status) of the instrument 100, the host computer can also use the periodically received status packets for sequencing of control commands and thus sequencing the control of the instrument 100.

If a multi-threaded embedded processor 110 is used (e.g., Analog Devices VDK for the TIGERSHARC DSP), then each thread of operation can be executing a command at the same time, as long as the commands are allowed to be executed at the same time. However, to execute multiple commands on the embedded controller 110, there may or may not be multiple threads on the embedded controller 110. For example, where instrument 100 is a microarray scanner and two stages are controlled (a fast stage and a slow stage), the movement of each stage is controlled by a function that reads the position of the stage and computes the motor current necessary to move the stage along the desired trajectory, such as at a steady velocity, or holding at a particular position. These functions are run every time a servo tick occurs, which, in one embodiment was once every 80 microseconds. In this case, both servo motors driving the fast and slow stages, respectively, are being controlled on the same thread, but they execute in sequence. The transfer of data (e.g., in the case of a scanner, the transfer of the measured fluorescence data from the microarray) runs on a separate execution thread on the embedded controller and is interruptible by the servo tick (e.g., to cause the fast stage and the slow stage to move). Thus, in one embodiment, the system 1000 can cause the fast stage and the slow stage of the scanner instrument 100 to move simultaneously by sending two commands from host computer 10, i.e., "FastStage.Move(position)" and "SlowStage.Move(position). Two threads are used on the host computer 10 to monitor the statuses of the fast stage and slow stage, respectively.

An instrument 100 can have a plurality of embedded controllers 110 which are commanded by host computer 10, with host computer 10 running in a multi-threaded fashion, as noted above. In another embodiment, instrument 100 has a single embedded controller 110 in the form of a multi-threaded digital signal processor (DSP) that operates in time slices and therefore effectively operates like multiple embedded controllers 110. As long as there is a memory location that all controllers or threads are writing to on the side of the instrument 100, the instrument can use a plurality of embedded controllers 110 or a single embedded controller, as long as the controller 110 that is responsible for sending the state packets has access to that memory and can therefore send the status packets to the host computer 10 as described.

The sending of a command, and waiting for acknowledgement of the command are locked by the calling thread. Thus, other execution threads cannot send a command until the acknowledgement of the present command is received. This is a key control mechanism that makes is possible and simple to have multiple commands being performed. In this way, an action commanded by one command does not have to be completed before another action, commanded by another command, can begin. For example, where the instrument 100 is a scanner, a command can be issued by the host computer 10 to calibrate the data acquisition system of instrument 100. After receipt of acknowledgement of the command, the host computer 10 can issue another command to move a microarray slide on the scanner. Since nothing is moving by executing the calibration command, the command to move the slide does not conflict with the command to calibrate. Accordingly, the movement of the slide can be conducted at the same lime that the execution of the calibration is being carried out on a separate thread, relative to the thread executing the slide movement.

The host computer 10 monitors the status and control of all embedded controller 110. Thus, when multiple embedded controllers 110 are employed in an instrument 100, the programming of the embedded controllers 110 does not need to be concerned with checking the statuses of other embedded controllers 110 before carrying out an operation, as this is all handled at the host computer 10 side. Thus, each embedded controller 110 can act on commands (if allowed) received from the host computer without regard to whether a command might conflict with a command being executed by another embedded controller 110.

Rather than using a purely periodic generation of status packets, certain events can be used to generate status packets immediately. These status packets are also preferably complete status packets, but may be less than complete status packets in the same manner as described above. Such events can be ones that the programmer of the embedded controller knows are events that, when they occur, the host computer will be waiting on data in regard to them. For example, the acknowledgement of a command, when received by the host computer 10, enables the host computer 10 to continue to its next task. As another example, the change in state of a motion axis of the instrument 100 may be of interest to the host computer 10. For example, when instrument 100 is a scanner, during scanning, at the end of every scan line, the embedded controller 110 sends a complete status packet with updated information relevant to that scan line.

Command generation and subsequent acknowledgement in a status packet are blocking operations. Thus only one command can be outstanding at any given time. An "outstanding" command is one that has been sent out by the host computer 10, but for which the host computer has not yet received an acknowledgement back from the embedded controller. Note that executions of commands can be in progress even though those commands are not outstanding. That is, the fact that a command is not outstanding does not imply that the command has been completed. It is possible for the host computer 10 to command an operation, receive an acknowledgement regarding the operation from the embedded controller that the command is allowed (in which case, the embedded control will begin to perform the command on an appropriate thread), and command another operation before the first operation has been completed. However, resource contentions must be tightly controlled by the programming, so that two operations are not attempted at the same time With a single piece of hardware of the instrument 100.

Because the host computer 10 may be connected to embedded controller 110/instrument 100 over an Ethernet, the system 1000 may be configured with this in mind, that the host computer 10 may not be operating on a real time operating system, a safety mechanism may be provided in the operating system. For example, although the system 1000 is designed so that the host computer 10 receives periodic status packets (e.g., every 0.1 seconds), the programming allows for this communication to be interrupted for a predetermined length of time (e.g., up to about 30 seconds in one embodiment, although the predetermined length of time may be set to a different time than 30 seconds in other embodiments). Because of this, the host computer 10 must only issue commands that are intrinsically safe. Thus, a command is given only if it can be carried out safely even if communication is lost between the embedded controller 110 and the host computer 10, and the host computer 10 is therefore not required to monitor the tasks carried out by the host computer for safety reasons. However, if communication is lost, this would prevent host computer 10 from issuing a further command that would conflict with a currently performing task, until such time as communication is regained and the host computer 10, by monitoring the status packets, detects that the task has been completed so that the next command can be safely issued. Thus, the programming of the host computer 10 and sequencing performed by the host computer are intrinsically safe.

Figure 4:
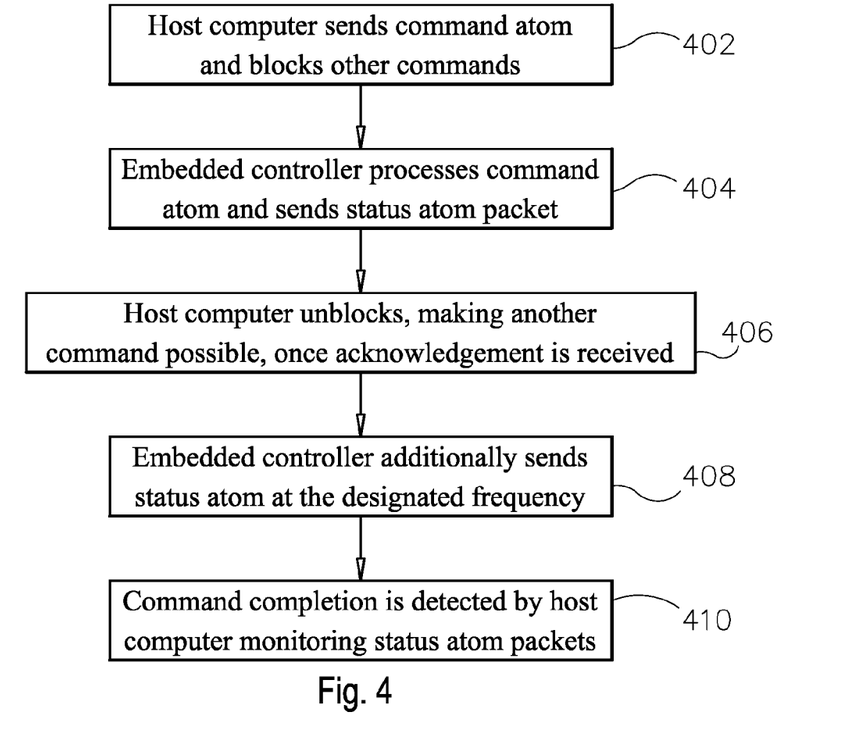
FIG. 4 illustrates events carried out by a system for commanding operation by a host computer of an instrument having an embedded controller, according to an embodiment of the present invention.

FIG. 4 illustrates events carried out by a system 1000 for commanding operation by a host computer 10 of an instrument 100 having an embedded controller 110, according to an embodiment of the present invention. At event 402, the host computer 10 sends a command (i.e., command atom) to the embedded controller 110. The host computer 10 blocks the possibility of sending another command atom until acknowledgement of the sent out command is received from the embedded controller 110. At event 404, the embedded controller 110 processes the command atom, but does not necessarily complete execution of the command at this lime. However, a status atom packet is immediately sent to the host computer 10 by the embedded controller. This status atom packet includes identification data of the command that was received, as well as the processing result (allowed or error) fields filled into the status atom. If allowed, this also implies that the embedded controller 110 has commenced execution of the command.

At event 406, upon processing the status atom packet and thus receiving the acknowledgement, the host computer 10 unblocks itself, thereby making it possible to send another command. In addition to the immediate sending of a status atom packet at event 404, the embedded controller continues to send the periodic status atom packets at the designated frequency of sending, asynchronously to the operation of the host computer's operating software, see event 408. This serves to keep the controlling software synchronized with the hardware stales of the instrument 100.

The completion of a task/action instructed by a command is detected by the host computer 10, by monitoring the incoming status atom packets received from the embedded controller 110 after sending the command to the embedded controller to perform the task. Thus, by monitoring the state of a component of the instrument that has been commanded to perform a task, the host computer 10 can tell what the state of that component and can tell when the task is finished by knowing what the state of the component should be upon completion of the task. Other status items that can be monitored to indicate command completion, include, but are not limited to the change of state of a servo loop. By allowing the host computer 10 to determine the status of command completion at the host computer side, this allows multithreading on the host computer 10, and multiple, simultaneous performance of activities being controlled by the embedded controller. Of course, the physical system of the instrument 100 must be locked by the host computer 10, whenever necessary, to prevent a conflicting command from being attempted to be carried out when a command is already in progress on that physical system.

Figure 5:
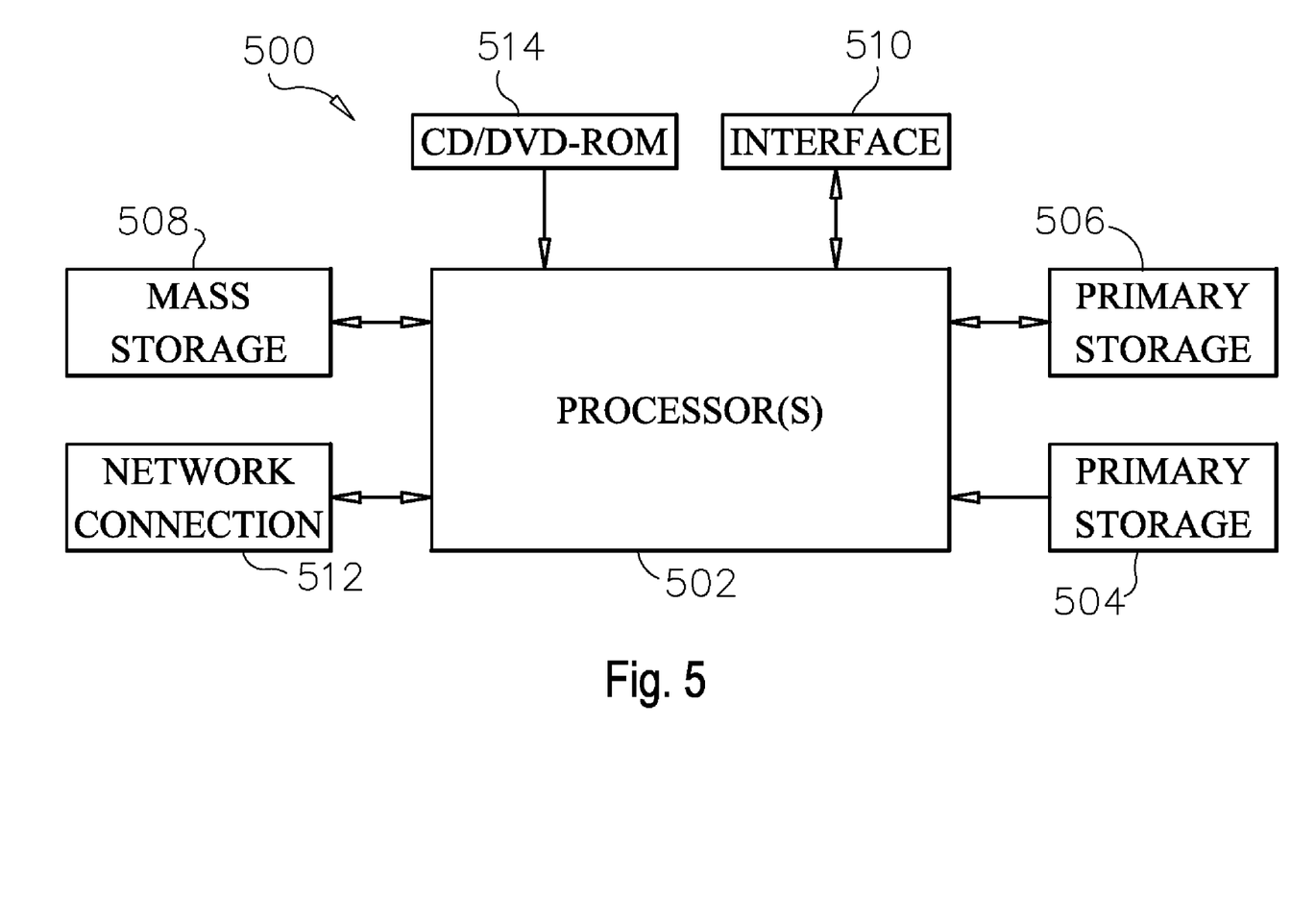
FIG. 5 illustrates a typical computer system in accordance with an embodiment of the present invention.

FIG. 5 illustrates a typical computer system in accordance with an embodiment of the present invention. For example, computer system 500 may be configured to function as host computer 10. Computer system 500 includes any number of processors 502 (also referred to as central processing units, or CPUs) that are coupled to storage devices including primary storage 506 (typically a random access memory, or RAM), primary storage 504 (typically a read only memory, or ROM). As is well known in the art, primary storage 504 acts to transfer data and instructions uni-directionally to the CPU and primary storage 506 is used typically to transfer data and instructions in a bi-directional manner. Both of these primary storage devices may include any suitable computer-readable storage media such as those described above. A mass storage device 508 is also coupled bi-directionally to CPU 502 and provides additional data storage capacity and may include any of the computer-readable media described above. It is noted here that the terms "computer readable media" "computer readable storage medium" "computer readable medium" and "computer readable storage media", as used herein, do not include carrier waves or other forms of energy, per se. Mass storage device 508 may be used to store programs, data and the like and is typically a secondary storage medium such as a hard disk that is slower than primary storage. It will be appreciated that the information retained within the mass storage device 508, may, in appropriate cases, be incorporated in standard fashion as part of primary storage 506 as virtual memory. A specific mass storage device such as a CD-ROM or DVD-ROM 514 may also pass data uni-directionally to the CPU.

CPU 502 is also coupled to an interface 510 that includes user interface 110, and which may include one or more input/ output devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. CPU 502 optionally may be coupled to a computer or telecommunications network using a network connection as shown generally at 512, such as to connect with instrument 100 and embedded processor 110, for example. With such a network connection, it is contemplated that the CPU might receive information from the network, or might output information to the network in the course of performing the above-described method steps. The above-described devices and materials will be familiar to those of skill in the computer hardware and software arts.

The hardware elements described above may implement the instructions of multiple software modules for performing the operations of this invention. For example, instructions for creating a "shadow" of the instrument state, for unpacking the status atom packets, and for sending commands, etc, may be stored on mass storage device 508 or 514 and executed on CPU 502 in conjunction with primary memory 506.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

We claim:

1. A method of controlling an instrument in communication with a host computer, said method comprising:
   sending a command to perform an action from said host computer to an embedded controller;
   processing the command by the embedded controller;
   controlling operations of an instrument that must be completed on schedule via said embedded controller embedded in said instrument;
   periodically sending a status packet to a host computer, wherein status values in each status packet are updated with each iteration of said sending a status packet.

2. The method of claim 1, wherein each of said status packet is a complete status packet.

3. The method of claim 1, wherein the host computer maintains a shadow of a state of the instrument by unpacking each of said status packets received.

4. The method of claim 1, wherein the host computer comprises a multi-threaded processor having multiple threads of operation, and wherein a plurality of said threads of operation each execute a command concurrently.

5. The method of claim 4, wherein said host computer monitors execution of each of said commands via said periodically sent status packets.

6. The method of claim 1, further comprising:
   testing, by the embedded controller, as to whether the command is allowed;
   sending an error code from the embedded controller to the host computer if the command is not allowed; and
   if the command is allowed, commencing execution of the command by the embedded controller.

7. The method of claim 6, wherein the embedded controller includes an acknowledgement of the command in the next periodically repeated sending of a status packet.

8. The method of claim 6, wherein the host computer is responsible for determining completion of the command by monitoring one or more fields in the periodically received status packets.

9. The method of claim 1, wherein a status packet is generated and sent from said embedded controller to said host computer upon the occurrence of a predetermined event.

10. The method of claim 9, wherein the instrument comprises a scanner and said predetermined event comprises the scanner reaching the end of a scan line.

11. The method of claim 9, wherein the status packet that is generated and sent upon the occurrence of a predetermined event is a complete status packet.

12. A method of controlling an instrument in communication with a host computer, said method comprising:
   sending a command atom from a host computer to an embedded controller embedded in said instrument;
   processing the command by the embedded controller;
   periodically generating and sending a status packet, including a status of the command, by said embedded controller to said host computer,
   wherein status values in each said status packet are updated with each iteration of said generating.

13. The method of claim 12, wherein each of said status packet is a complete status packet.

14. The method of claim 12, wherein said processing the command comprises controlling the instrument to at least partially perform a physical act.

15. The method of claim 12, wherein said host computer prevents additional commands from being sent until acknowledgement of the command has been sent is received in one of said status packets.

16. The method of claim 12, wherein completion of a task instructed by said command is detected by said host computer by monitoring status values in said status packets.

17. The method of claim 12, wherein a physical system of said instrument required for a task by said command is locked out by said host computer during performance of the task, thereby preventing a conflicting command that requires use of that system from being sent from the host computer to the embedded controller.

18. The method of claim 12, wherein the host computer comprises a multi-threaded processor having multiple threads of operation, and wherein a plurality of said threads of operation each execute a command concurrently.

19. The method of claim 18, wherein said host computer monitors execution of each of said commands via said periodically sent status packets.

20. An instrumentation system comprising:
   an instrument including an embedded controller configured to control execution of operations by said instrument;
   a host computer configured to communicate with said embedded controller; and
   programming configured to control operation of the system, which when executed by said system performs:
   periodically generating and sending a status packet including status parameters of the instrument, by said embedded controller to said host computer,
   wherein said status parameters in each status packet are updated with each iteration of repeating said generating; and
   wherein execution of said programming further causes said system to perform sending a command atom by said host computer to said embedded controller and processing the command atom by said embedded controller.

21. The instrument of claim 20, wherein each of said status packet is a complete status packet.

22. The system of claim 20, wherein execution of said programming further causes said system to perform:
generating and sending one of said status packets, including a status of the command, by said embedded controller to said host computer.

23. The method of claim 20, wherein said processing the command comprises controlling the instrument to at least partially perform a physical act.

24. A non-transitory computer readable medium that provides instructions, which when executed on at least one processor, causes the at least one processor to perform a method comprising:
sending a command atom by said host computer to said embedded controller;
processing the command atom by said embedded controller;
periodically generating and sending a status packet including status parameters of an instrument, by an embedded controller embedded in the instrument, to a host computer,
wherein said status parameters in each status packet are updated with each iteration of said generating.

25. The non-transitory computer readable medium of claim 24, wherein said instructions, when executed on said at least one processor, cause said at least one processor to perform:
generating and sending one of said status packets, including a status of the command, by said embedded controller to said host computer.

26. The non-transitory computer readable medium of claim 24, wherein each of said status packet is a complete status packet.

* * * * *

UNITED STATES PATENT AND TRADEMARK OFFICE
CERTIFICATE OF CORRECTION

PATENT NO. : 8,332,737 B2
APPLICATION NO. : 12/492487
DATED : December 11, 2012
INVENTOR(S) : Peter G. Webb et al.

It is certified that error appears in the above-identified patent and that said Letters Patent is hereby corrected as shown below:

In column 12, line 62, in claim 20, delete "repeating said" and insert -- said --, therefor.

Signed and Sealed this
Twelfth Day of February, 2013

Teresa Stanek Rea
*Acting Director of the United States Patent and Trademark Office*